United States Patent
Holtrup et al.

(10) Patent No.: US 11,753,138 B2
(45) Date of Patent: Sep. 12, 2023

(54) AIRCRAFT DOOR LOCK, AIRCRAFT DOOR AND AIRCRAFT HAVING AN AIRCRAFT DOOR

(71) Applicant: Airbus Operations GmbH, Hamburg (DE)

(72) Inventors: Bernhard Holtrup, Hamburg (DE); Daniel Spengler, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 830 days.

(21) Appl. No.: 16/556,496

(22) Filed: Aug. 30, 2019

(65) Prior Publication Data
US 2020/0071978 A1    Mar. 5, 2020

(30) Foreign Application Priority Data

Aug. 31, 2018   (DE) .......................... 102018121307.7

(51) Int. Cl.
| | |
|---|---|
| *E05B 85/04* | (2014.01) |
| *E05B 85/20* | (2014.01) |
| *B64C 1/14* | (2006.01) |
| *E05C 5/00* | (2006.01) |

(52) U.S. Cl.
CPC ............ *B64C 1/1407* (2013.01); *B64C 1/143* (2013.01); *E05B 85/04* (2013.01); *E05B 85/20* (2013.01); *E05C 5/00* (2013.01); *E05Y 2900/502* (2013.01); *Y10T 292/1043* (2015.04)

(58) Field of Classification Search
CPC ..... B64C 1/143; B64C 1/1423; B64C 1/1407; B64C 1/14; E05D 15/56; E05C 85/04; E05C 85/20; Y10S 292/51; Y10T 16/54025; Y10T 16/540257; Y10T 292/1043; Y10T 292/1039
See application file for complete search history.

(56) References Cited

U.S. PATENT DOCUMENTS

| | | | | |
|---|---|---|---|---|
| 2,748,855 | A | * | 6/1956 | Siems ................... B64C 1/1415 160/180 |
| 2,763,900 | A | * | 9/1956 | Frankw ................. B64C 1/1407 49/248 |

(Continued)

FOREIGN PATENT DOCUMENTS

| | | | | |
|---|---|---|---|---|
| CN | 104144851 | A | * 11/2014 | ........... B64C 1/1423 |
| CN | 106812400 | A | * 6/2017 | ........... B64C 1/1407 |

(Continued)

OTHER PUBLICATIONS

German Search Report; priority document.

*Primary Examiner* — Carlos Lugo
(74) *Attorney, Agent, or Firm* — Greer, Burns & Crain, Ltd.

(57) ABSTRACT

An aircraft door lock having a bolt and a closure block, wherein the bolt is fastened in a movable manner to a door leaf structure and the closure block can at least partially receive the bolt. The closure block prevents any movement of the bolt in at least one direction, wherein the closure block is arranged on a portion of a hinge arm that overlaps the door leaf structure when the door leaf structure is in a closed position. Furthermore, an aircraft door having such an aircraft door lock, and an aircraft having such an aircraft door are described.

10 Claims, 4 Drawing Sheets

(56) References Cited

U.S. PATENT DOCUMENTS

| | | | | | |
|---|---|---|---|---|---|
| 3,791,073 | A | * | 2/1974 | Baker | B64C 1/1407 49/40 |
| 4,560,123 | A | * | 12/1985 | Sealey | B64C 1/1407 244/129.5 |
| 4,854,010 | A | * | 8/1989 | Maraghe | B64C 1/1407 49/248 |
| 5,031,863 | A | * | 7/1991 | Noble | B64C 1/1407 D12/345 |
| 5,064,147 | A | * | 11/1991 | Noble | B64C 1/1407 292/DIG. 31 |
| 5,305,969 | A | * | 4/1994 | Odell | B64C 1/1407 292/259 R |
| 5,687,452 | A | * | 11/1997 | Hamatani | B64C 1/1407 137/493 |
| 5,931,415 | A | * | 8/1999 | Lingard | B64C 1/143 74/105 |
| 6,655,634 | B2 | * | 12/2003 | Erben | B64C 1/1407 49/246 |
| 6,691,953 | B2 | | 2/2004 | Leclerc | |
| 8,007,026 | B2 | * | 8/2011 | Scott | E05D 3/127 296/146.12 |

FOREIGN PATENT DOCUMENTS

| | | | | | |
|---|---|---|---|---|---|
| DE | 1105725 | B | * | 4/1961 | |
| DE | 60300014 | T2 | | 8/2005 | |
| FR | 3018064 | A1 | * | 9/2015 | B64C 1/143 |
| FR | 3067701 | A1 | * | 12/2018 | B64C 1/1407 |
| FR | 3097196 | A1 | * | 12/2020 | B64C 1/1423 |
| GB | 1551821 | A | * | 9/1979 | B64C 1/1407 |

\* cited by examiner

AIRCRAFT DOOR LOCK, AIRCRAFT DOOR AND AIRCRAFT HAVING AN AIRCRAFT DOOR

CROSS-REFERENCES TO RELATED APPLICATIONS

This application claims the benefit of the German patent application No. 10 2018 121 307.7 filed on Aug. 31, 2018, the entire disclosures of which are incorporated herein by way of reference.

FIELD OF THE INVENTION

The invention relates to an aircraft door lock, to an aircraft door having an aircraft door lock, and to an aircraft having such an aircraft door. In particular, the invention relates to an aircraft door lock, wherein a closure block of the aircraft door lock is arranged on a hinge arm. Furthermore, the invention relates to an aircraft door having such an aircraft door lock, and to an aircraft having such an aircraft door.

BACKGROUND OF THE INVENTION

In order to close an opening in the aircraft outer skin, conventional aircraft doors are usually positioned over the opening (by rotary movement and/or parallel displacement) and subsequently moved downward in order to bring door hinges on usually several sides of the door or of the door frame into an overlapping position, such that the door cannot be pushed open toward the outside. In this downwardly moved position, the door is locked. For this purpose, locks are usually provided on an underside of the door and/or on the vertically extending sides of the door. These locks have to be released before the door can be moved upward in order to move the door hinges out of their overlapping position such that the door can be fully opened again.

SUMMARY OF THE INVENTION

The invention is based on an object of providing an aircraft door lock that securely closes an aircraft door but at the same time has a simpler construction and is more lightweight. Furthermore, an aircraft door and an aircraft having such an aircraft door lock are intended to be provided.

According to a first aspect, an aircraft door lock comprises a bolt that is configured to be fastened in a movable manner to a door leaf structure, and a closure block that is configured to at least partially receive the bolt and to prevent any movement of the bolt in at least one direction. The door leaf structure is a door leaf including structural components that hold and support the door leaf. For example, the door leaf structure also includes frame elements to which the door leaf is fastened.

The closure block is arranged on or in a portion of a hinge arm, wherein the portion of the hinge arm overlaps the door leaf structure when the door leaf structure is in a closed position. In other words, the hinge arm is arranged such that, with the door closed (closed position of the door leaf structure), it is located in front of the door leaf structure. The hinge arm is mechanically coupled to the door leaf structure in order to selectively move the door leaf structure between its closed position and an open position.

Furthermore, in the closed position of the door leaf structure, the hinge arm can be arranged in a manner bearing against the door leaf structure or in the immediate vicinity of the door leaf structure. Since the bolt is fastened to the door leaf structure, the bolt can thus already be received in the closure block by way of small movements and take up a locked position.

As a result of the door leaf structure, and thus the aircraft door, being locked by way of the hinge arm, it is possible to dispense with locking devices at the outer periphery of the door leaf structure and corresponding locking devices in the door frame. Usually, locking devices are provided on the outside of the door leaf structure, which are coupled to a closing mechanism via corresponding mechanical devices extending inside the door leaf structure. As a result of the closure block being arranged on or in a portion of a hinge arm, it is possible to dispense with external locking devices, with the result that the door has a simpler structure and is rendered more lightweight.

In a variant configuration, the closure block can be in the form of a cavity in the hinge arm. In this case, the cavity can be accessible to the bolt from one side, while the other regions are closed by the hinge arm.

Alternatively or additionally, the closure block can comprise an opening and a boundary wall, wherein the opening is configured to receive the bolt in the closure block, and wherein the boundary wall is arranged at an angle to an opening plane formed by the opening. For example, the closure block can be part of the hinge arm that is open on a side facing the bolt. In this case, the exemplary cavity, which itself can have any desired shape, can be located behind the opening. Of course, the closure block can also be formed only on one side of the hinge arm, in which case the closure block does not represent a circumferentially closed cavity. In other words, the closure block can be formed by a cutout on one side of the hinge arm, the block being filled by the bolt but only partially receiving the bolt itself. In a further alternative, the closure block is formed only by the side of a hinge arm against which the bolt bears with one side when the bolt is in a locked position. Since the bolt has to be prevented from moving only in one direction, this is brought about by the side of the hinge arm. In this case, lateral guides for the bolt can additionally be provided on the side of the hinge arm, in order to always move the bolt into the correct locked position.

In a further variant configuration, the bolt can be configured to carry out a linear movement or a rotary movement in order to be partially received in the closure block. For a linear movement, it is sufficient for the bolt to be moved along an axis (for example its longitudinal axis) in the direction of the closure block and back again. For this purpose, the bolt can be arranged on a piston or form part of a piston. For example, the bolt can be implemented by a hydraulically, pneumatically and/or electrically moved piston.

If the aircraft door lock is configured to carry out the rotary movement of the bolt, the aircraft door lock can furthermore comprise a rotation element, which is connected to the bolt for conjoint rotation, and an actuating rod, which is coupled to the rotation element in a manner spaced apart from the rotation element. In this case, the actuating rod is configured to carry out a reciprocating movement about an axis of rotation of the rotation element. As a result of this reciprocating movement, the rotation element is rotated about an axis of rotation. The bolt fastened thereto is thus moved selectively between an open position, in which the bolt is not received in the closure block, and a locked position, in which the bolt is at least partially received in the closure block. The reciprocating movement of the actuating rod can likewise be effected via a piston (hydraulically, pneumatically and/or electrically operated).

Alternatively, also if the aircraft door lock is configured to carry out the rotary movement of the bolt, the aircraft door lock can furthermore comprise a joint, to which the bolt is fastened in a rotatable manner, and an actuating rod, which is hinged to the bolt in a manner spaced apart from the joint. The joint is arranged in the door leaf structure. Furthermore, in particular the actuating rod is configured to carry out a reciprocating movement about a joint axis of the joint such that the bolt can be moved selectively between an open position, in which the bolt is not received in the closure block, and a closed position (or locked position), in which the bolt is at least partially received in the closure block. The reciprocating movement of the actuating rod can likewise be effected via a piston (hydraulically, pneumatically and/or electrically operated).

In a further development, the bolt is arranged on the rotation element or the joint such that, in the closed position of the bolt, a longitudinal axis of the bolt coincides with an opening direction of the door leaf structure. This allows an optimum introduction of force from the door leaf structure into the rotation element or the joint if the door leaf structure is intended to be opened in the locked state. In this way, the locking of the door leaf structure is particularly secure.

Alternatively or additionally, the bolt can also be in the form of a hook, while the closure block comprises a pin. For example, the pin can be arranged in the cavity. The hook-form bolt is in this case configured to at least partially enclose the pin in the event of a rotary movement by the rotation element or about the joint, such that the bolt is blocked by the pin in at least one direction.

In a further variant configuration, the aircraft door lock also comprises a sliding device, which is arranged on the portion of the bolt that is received in the closure block. For example, the sliding device can be a coating of the bolt, such that the latter slides into the closure block and back out again as easily as possible. Alternatively or additionally, the sliding device can be a roller arranged in a rotatable manner on the bolt. In this case, the roller can be the portion of the bolt that is received in the closure block.

Likewise alternatively or additionally, the closure block can be an opening or cutout in the hinge arm, in which the roller and a part of the bolt are received. For this purpose, the closure block has, in the hinge arm, an opening that corresponds to a projection of the roller with the bolt. Furthermore, the roller can be attached to one side of the bolt such that the projection of the roller with the bolt is L-shaped or T-shaped. This results in at least one stop side on the roller or the bolt, the stop side extending substantially perpendicularly to the direction in which the movement of the bolt is prevented by the closure block. In other words, the stop side is substantially perpendicular to a direction in which the door leaf structure is moved in order to unlock it.

According to a further aspect, an aircraft door comprises a door leaf structure, which is configured to close an opening in an aircraft, and a hinge arm, which is coupled to the door leaf structure and is configured to guide the door leaf structure between an open position and a closed position, in which the opening in the aircraft is closed by the door leaf structure. Furthermore, the aircraft door comprises an aircraft door lock according to the first aspect.

In this case, the hinge arm can be configured to be coupled in an articulated manner to an aircraft structure, in order to carry out a rotary movement. At an opposite end of the hinge arm, the hinge arm can be connected securely to the door leaf structure or in an articulated manner to the door leaf structure. As a result of the rotary movement of the hinge arm relative to the aircraft structure, the door leaf structure is brought into the closed position.

In a further variant configuration, the aircraft door also comprises a lifting mechanism, which is configured to move the door leaf structure in the closed position in a direction that differs from a direction of movement of the door leaf structure between the open position and the closed position. For example, the lifting mechanism can move the door leaf structure relative to the hinge arm. In this case, the direction of movement that is brought about by the lifting mechanism can extend perpendicularly to a direction of movement that is brought about by the hinge arm and/or by the door leaf structure being hinged to the hinge arm. Only by way of example, the movement of the door leaf structure by the hinge arm can extend in a horizontal plane, while the movement by the lifting mechanism extends in a vertical plane. Of course, the planes can also be oblique planes, i.e., planes that are not precisely horizontal or vertical. However, the two planes are at an angle to one another.

In a further development of the aircraft door, the latter comprises at least one two-part door hinge, wherein a (first) part of the door hinge is arranged on the door leaf structure and a (second or further) part of the door hinge is arranged on an aircraft structure surrounding the opening in the aircraft. In other words, the opening in the aircraft is formed by a door frame in which the door leaf structure is arranged when the door leaf structure is in its closed position.

In this case, the lifting mechanism can also be configured to move the door leaf structure such that the two parts of the door hinge can be moved into an overlapping position and a free position. In other words, as a result of the movement of the door leaf structure brought about by the hinge arm, the two parts of the door hinge are moved past one another, since the two parts of the door hinge are in their free position. As a result of the movement of the door leaf structure brought about by the lifting mechanism, the two parts of the door hinge can be made to overlap, with the result that the door leaf structure is prevented from moving in the direction of movement caused by the hinge arm. The two parts of the door hinge in this case bear against and overlap one another, such that the door leaf structure is held in this position. For this purpose, the two parts of the door hinge have surfaces that are at an angle to the direction of movement brought about by the hinge arm. Preferably, the part of the door hinge that is arranged on the aircraft structure is positioned outside the part of the door hinge that is arranged on the door leaf structure, when the door leaf structure is in its closed position. In other words, the part of the door hinge that is arranged on the door leaf structure moves on a side, facing the aircraft interior, of the part of the door hinge that is arranged on the aircraft structure.

Alternatively or additionally, the aircraft door can also comprise a joint arrangement, which is arranged between the hinge arm and the door leaf structure and is configured to allow a first rotary movement of the door leaf structure relative to the hinge arm while the door leaf structure is guided between the open position and the closed position, and to allow a second movement, caused by the lifting mechanism, of the door leaf structure relative to the hinge arm. In this case, the second movement can exhibit a direction that is substantially parallel to an axis of rotation of the first rotary movement. The second movement of the door leaf structure can be implemented by a double joint (a rod with a joint at each end), wherein the axes of rotation of the double joint are parallel to one another and exhibit an angle to an axis of rotation of the first rotary movement. For example, the axes of rotation of the double joint can be substantially perpendicular to the axis of rotation of the first rotary movement.

The first rotary movement of the door leaf structure relative to the hinge arm makes it possible for not just a rotary movement of the door leaf structure relative to the aircraft structure to be carried out. Rather, a partial or complete parallel displacement of the door leaf structure between its closed position and open position is also possible.

While the first rotary movement is optional, since it merely accompanies a rotary movement of the hinge arm relative to the aircraft structure, the second movement of the door leaf structure allows the aircraft door to be closed. Thus, it is possible for example for the door leaf structure to be moved into an opening in the aircraft by a rotary movement of the hinge arm and (optionally) by the first rotary movement. In this position of the door leaf structure, the door leaf structure can be moved freely. As a result of the second movement of the door leaf structure, the parts of the door hinge can be made to overlap, and so the first rotary movement of the door leaf structure or the rotary movement of the hinge arm is prevented. In other words, the door leaf structure is closed, since the door leaf cannot be moved out of the aircraft and/or into the aircraft.

The aircraft door lock can then prevent any movement of the door leaf structure in a state in which the parts of the door hinge overlap. For example, the bolt can be arranged on the door leaf structure such that it can cooperate with the closure block only when the door leaf structure is in the position in which the parts of the door hinge overlap. In other words, by way of the lifting mechanism, the door leaf structure can be brought into a position in which the bolt can be received by the closure block and the closure block can prevent any movement of the bolt. In particular, the closure block can prevent any movement of the bolt that corresponds to the movement of the door leaf structure by the lifting mechanism. As a result, the door leaf structure cannot be brought into a position in which the parts of the door hinge are free, and so the aircraft door is closed and locked.

According to a further aspect, and aircraft comprises at least one aircraft door according to the second aspect.

Alternatively, it is also possible for some other vehicle to have at least one vehicle door according to the second aspect. For example, such a vehicle door can be installed in a bus, a train or a ship.

The aspects, further developments, configurations and variants described herein can be combined as desired, and so further variant configurations that are not explicitly described are included in the present disclosure.

BRIEF DESCRIPTION OF THE DRAWINGS

In the following text, exemplary embodiments of the invention are described in more detail with reference to the drawings.

DETAILED DESCRIPTION OF THE PREFERRED EMBODIMENTS

According to the present invention, an aircraft door lock having a closure block arranged on a hinge arm is described. Furthermore, an aircraft door and an aircraft having such an aircraft door lock are described.

Figure 1:
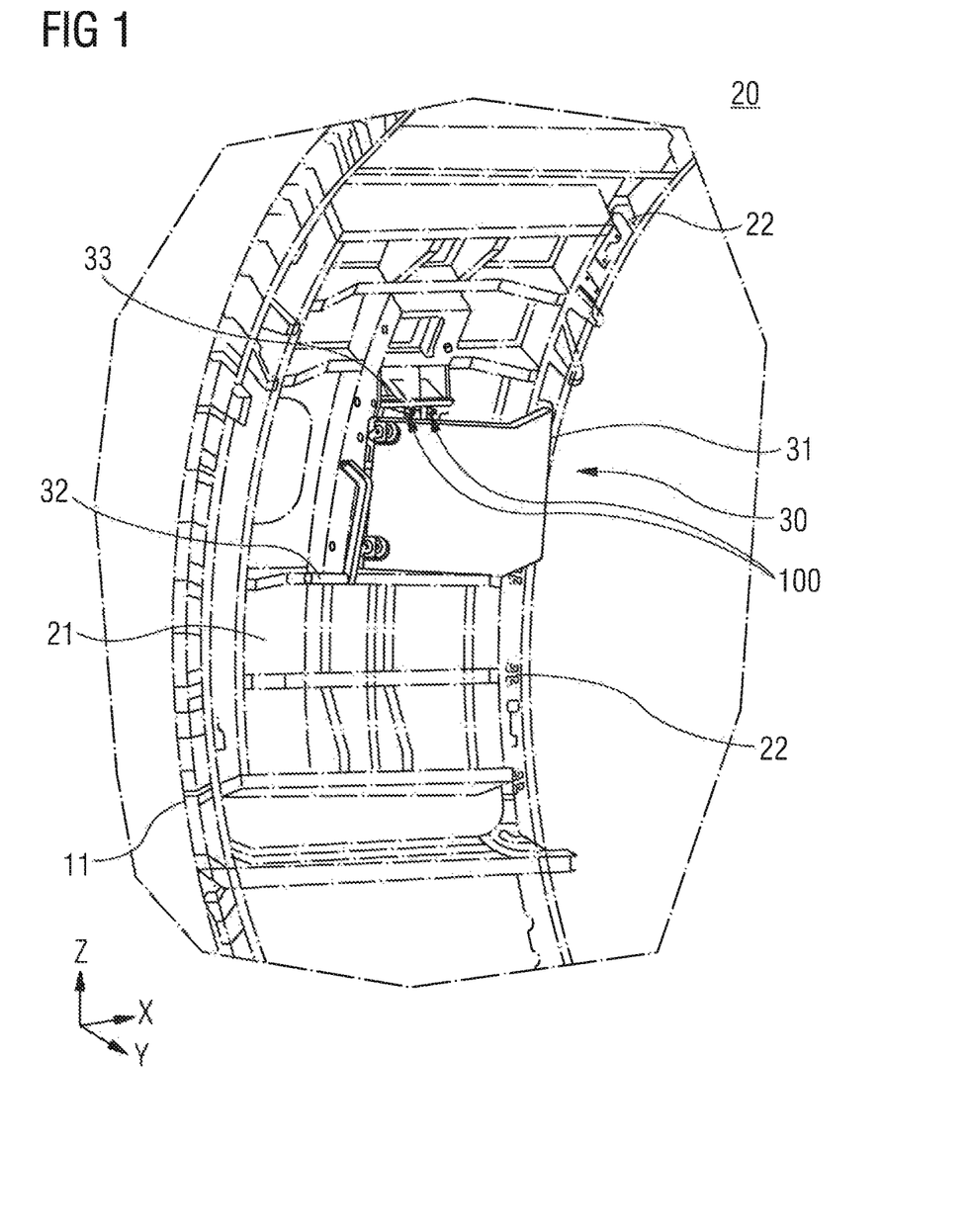
FIG. 1 schematically shows a perspective illustration of an aircraft door.
Figure 5:
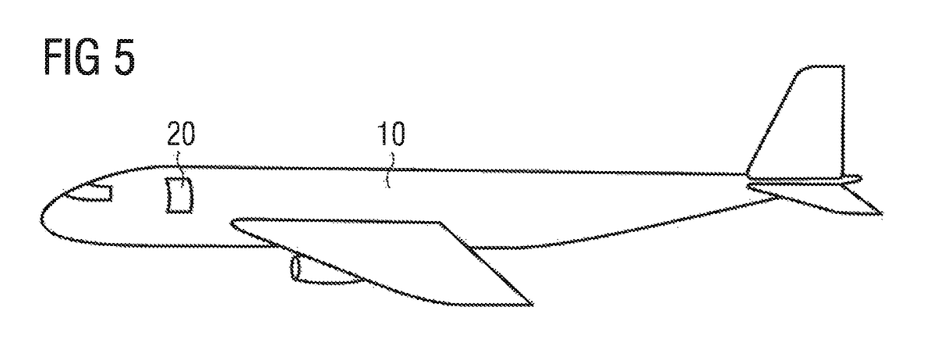

FIG. 5 shows, for example, a vehicle in the form of an aircraft 10, while FIG. 1 schematically shows a perspective illustration of an aircraft door 20, which closes an opening in an aircraft fuselage structure 11. The aircraft door 20 is illustrated from an aircraft interior in FIG. 1. On the aircraft fuselage structure 11, it is possible for parts of door hinges 22 and a hinge arrangement 30 to be provided, these allowing a door leaf structure 21 to be opened and closed. The hinge arrangement 30 can have a hinge arm 31, which is connected, on the right in FIG. 1, to an aircraft fuselage structure 11 in an articulated manner. On an opposite side of the hinge arm 31, the latter can be coupled to the door leaf structure 21. In this case, the hinge arm 31 is configured to guide the door leaf structure 21 between an open position and a closed position, shown in FIG. 1, in which the opening in the aircraft 10 is closed.

The aircraft door 20 additionally has an aircraft door lock 100. The aircraft door lock 100 can be located between an interior of the door leaf structure 21 and the hinge arm 31.

Figure 2:
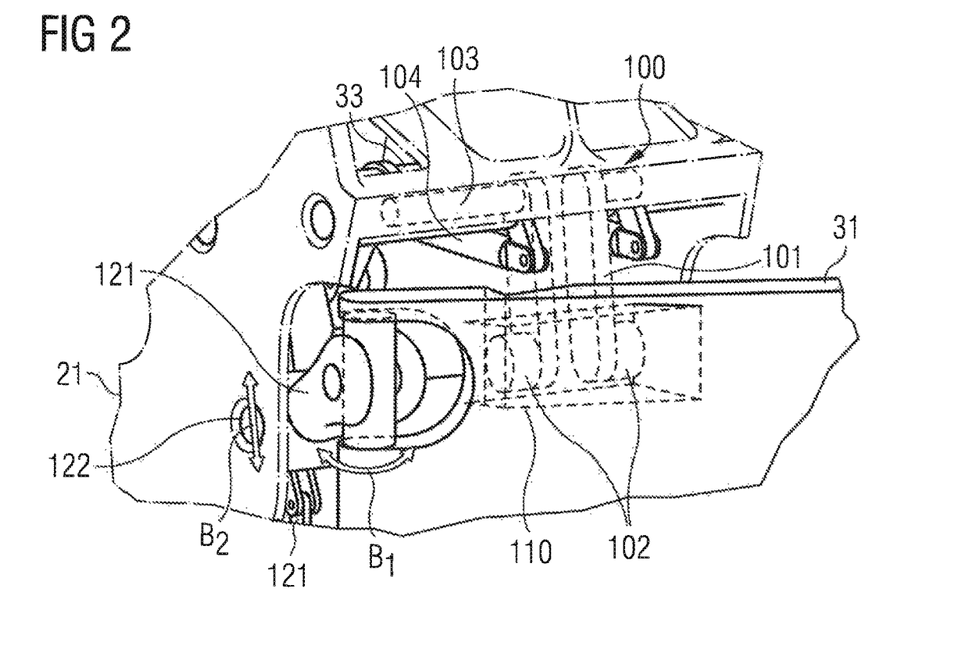
FIG. 2 schematically shows a perspective illustration of an aircraft door lock.

FIG. 2 schematically shows a perspective illustration of an aircraft door lock 100, which has a bolt 101, which is configured to be fastened in a movable manner to the door leaf structure 21. In the variant of the aircraft door lock 100 that is illustrated in FIG. 2, the aircraft door lock 100 has a rotation element 103, which is connected to the bolt 101 for conjoint rotation. Alternatively, the bolt 101 is fastened to a joint 103 in a rotatable manner. In both cases, the bolt 101 can carry out a rotary movement relative to the door leaf structure 21.

Figure 3:
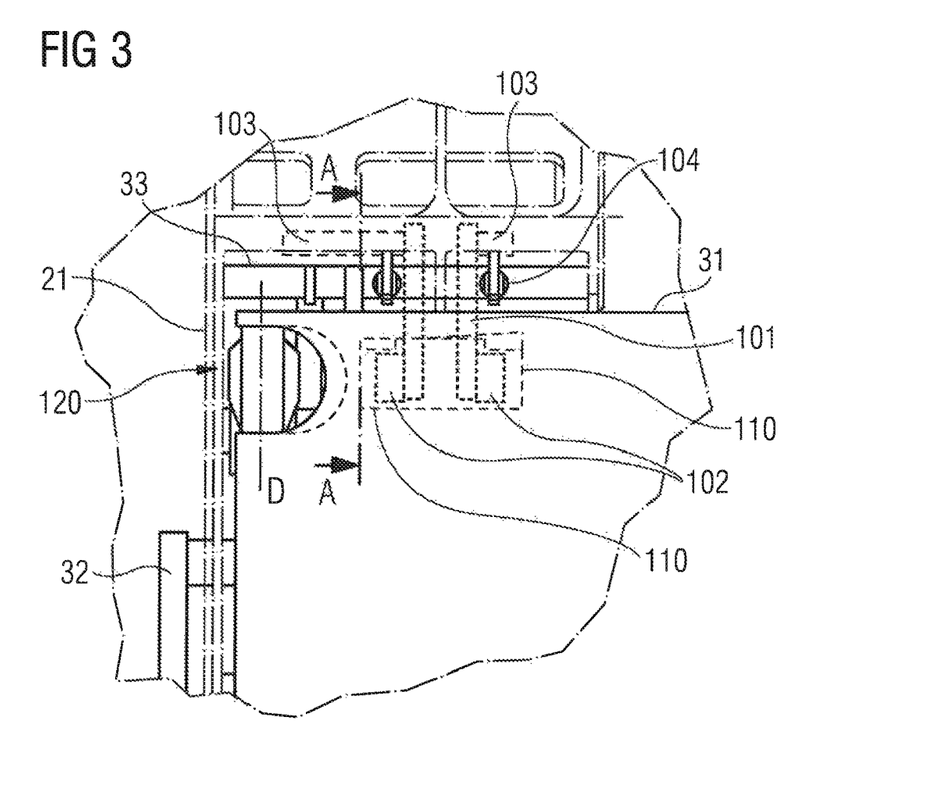
FIG. 3 schematically shows a view of the aircraft door lock from FIG. 2.
Figure 4:
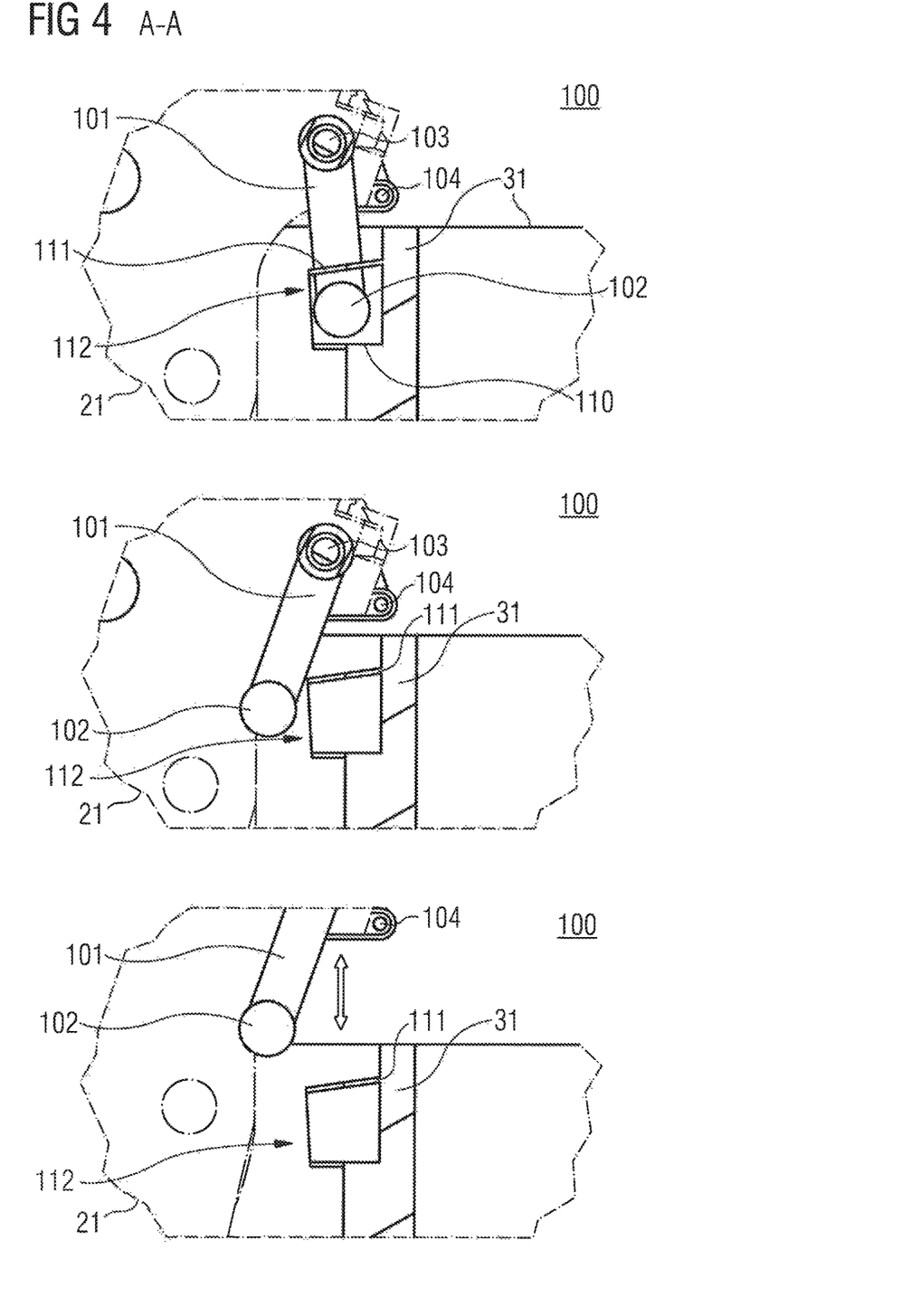
FIG. 4 schematically shows cross sections through an aircraft door lock along the section line A-A in FIG. 3 with different positions of a bolt and of a door leaf structure, and FIG. 5 schematically shows an aircraft with an aircraft door.

The aircraft door lock 100 also has a closure block 110, which is configured to at least partially receive the bolt 101. In this case, the closure block 110 prevents any movement of the bolt 101 in at least one direction. The direction in which the closure block 110 prevents the movement of the bolt 101 is upward in FIG. 2, in the direction of the rotation element/joint 103, as is apparent, in particular, from the illustrations in FIGS. 3 and 4. Thus, FIG. 3 schematically shows a view of the aircraft door lock 100 from FIG. 2 and FIG. 4 schematically shows a cross section through an aircraft door lock along the section line A-A in FIG. 3.

The closure block 110 is arranged on a portion of the hinge arm 31, wherein the portion of the hinge arm 31 overlaps the door leaf structure 21 when the door leaf structure 21 is in its closed position. This overlap, illustrated, in particular, in FIG. 1, relates to an arrangement of the hinge arm 31 in a parallel manner in front of the door leaf structure 21. As is apparent from FIG. 4, this overlap can also comprise the location in one another (above one another) of some parts of the door leaf structure 21 and of the hinge arm 31 or at least of the closure block 110 in a viewing direction perpendicular to a main plane of the door leaf structure 21. Thus, it is possible, for example, for the hinge arm 31 to be located within a fictitious body that is defined by the outer limits of the door leaf structure 21. Thus, a very compact aircraft door 20 can be achieved.

The closure block 110 can be in the form of a cavity in the hinge arm 31. In this case, an opening 111 into the cavity faces the door leaf structure 21 such that the bolt 101, coming from the door leaf structure 21, can be received at least partially in the cavity. A boundary wall 111 of the cavity, in this case a top of the cavity, limits movement of the bolt 101. The boundary wall 111 preferably exhibits an angle to an opening plane formed by the opening 112. As a result, the bolt 101 can be guided next to (in this case under) the boundary wall 111 and be blocked by the boundary wall 111 in at least one direction. Therefore, the cavity does not need to be downwardly closed but can also be in the form of a cutout in an underside of the hinge arm 31. Of course, it is also possible for only an underside of the hinge arm 31 to act as a boundary wall 111, without a cavity or a cutout being provided.

The bolt 101 can be configured as a pin (not illustrated), which engages in the closure block 110 (is moved into and out of the opening) in a linear manner along a longitudinal axis of the pin. Alternatively, the bolt 101, as illustrated in FIGS. 2 to 4, can carry out a rotary movement by the rotation element or about the joint 103, wherein at least one portion of the bolt 101 can be brought into an overlapping position (for example into engagement) with the closure block 110 formed by the cavity and the boundary wall 111. For this purpose, a roller 102 or some other protrusion is provided on the illustrated bolt 101, the roller 102 or protrusion being able to be guided into the closure block 110 through the opening 112.

Whereas, for a linearly guided bolt (not shown), an opening 112 having a shape corresponding to the bolt cross section is sufficient, for the rotatably mounted bolt 101, an L-shaped or T-shaped opening 112 is more suitable. As a result, the roller is introduced into the cavity in the closure block 110 together with a portion of the rest of the bolt 101, while one side of the roller or of the protrusion corresponds to a leg of the L-shaped or T-shaped opening 112 (i.e., of the boundary wall 111).

In FIG. 4, different states of the aircraft door lock 100 from a locked position to an open position are illustrated from top to bottom. In the locked position illustrated at the top, the bolt 101 is prevented from moving upward by the closure block 110, in particular the boundary wall 111. Since the bolt 101 is fastened to the door leaf structure 21, the door leaf structure 21 is also prevented from moving upward. Therefore, the door leaf structure 101 is locked.

For unlocking, the bolt 101 is released from the closure block 110. For this purpose, the bolt 101 is pivoted by the rotation element or about the joint 103 such that the roller 102 or other protrusion no longer overlaps the boundary wall 111.

The pivoting of the bolt 101 can comprise an actuating rod 104, which is coupled to the rotation element 103 in a manner spaced apart from the rotation element 103. In this case, the actuating rod 104 is configured to carry out a reciprocating movement about an axis of rotation of the rotation element 103. As a result of this reciprocating movement, the rotation element 103 is rotated about an axis of rotation. The bolt 101 fastened thereto is thus likewise rotated.

Alternatively, for pivoting the bolt 101, an actuating rod 104 can be hinged to the bolt 101 in a manner spaced apart from the joint 103. Likewise alternatively, an actuator (not shown) can be provided at the joint 103 or instead of the joint 103, the actuator rotating the bolt 101 about an axis (corresponding to an axis of rotation of the rotation element 103) between the two positions illustrated in FIG. 4.

The now released bolt 101 also allows the door leaf structure 21 to move upward, as is shown at the bottom in FIG. 4, and the movement of the door leaf structure 21 is indicated by a double arrow. The door leaf structure 21 can be raised and lowered for example by a lever 32 (FIG. 1) and a lifting mechanism attached thereto. For this movement of the door leaf structure 21, various mechanisms can be provided. For example, via the lever 32, a push rod 121 can be actuated, which moves the door leaf structure 21 relative to the hinge arm 31. For this purpose, the lever 32 can be fastened in a rotatable manner to the hinge arm 31, such that the lever 32 is supported on the hinge arm 31 and moves the door leaf structure 21 relative thereto (upward and downward).

For this purpose, it is also possible for a joint arrangement 120 to be arranged between the hinge arm 31 and the door leaf structure 21. This joint arrangement 120 allows a first rotary movement B1 of the door leaf structure 21 relative to the hinge arm 31, for example while the door leaf structure 21 is being guided between the open position and the closed position, and also allows a second movement B2, caused by the lifting mechanism 32, of the door leaf structure 21 relative to the hinge arm 31. In this case, the second movement exhibits a direction that is substantially parallel to an axis of rotation D (FIG. 3) of the first rotary movement B1. The first rotary movement B1 is optional and relates primarily to a movement of the hinge arm 31 relative to the aircraft fuselage structure 11.

As a result of the door leaf structure 21 being lifted relative to the hinge arm 31, the door hinges 22 are brought into a free position. In other words, the parts of the door hinges 22 that are arranged on the door leaf structure 21 are moved into a free position from a position overlapping the parts of the door hinges 22 that are arranged on the aircraft fuselage structure 11. Subsequently, the door leaf structure 21 can be pivoted by the hinge arm 31 and open up the opening in the aircraft fuselage structure 11.

The variants, configurations and exemplary embodiments outlined above serve merely to describe the claimed teaching, but do not limit the latter to the variants, configurations and exemplary embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft door lock comprising:
   a first bolt and a second bolt each configured to be rotationally fastened to a door leaf structure; and
   a closure block that is configured to receive the first bolt and the second bolt to prevent any movement of the first and second bolts in at least one direction,
   wherein the closure block is arranged on a portion of a hinge arm,
   wherein the portion of the hinge arm overlaps the door leaf structure when the door leaf structure is in a closed position, wherein the hinge arm has a first side facing the door leaf and a second side opposite the first side facing away from the door leaf, wherein the closure block is formed on the first side of the hinge arm facing the door leaf, wherein the closure block comprises a cavity in the hinge arm, wherein the cavity has a top wall;

wherein the closure block comprises an opening and a boundary wall corresponding to the top wall of the cavity, wherein the opening is sized to receive the first bolt and the second bolt in the closure block, and wherein the boundary wall is arranged at an acute angle to an opening plane formed by the opening such the boundary wall angles upwardly from the opening towards a back of the cavity.

2. The aircraft door lock according to claim 1, wherein the bolt is configured to carry out a rotary movement in order to be partially received in the closure block.

3. The aircraft door lock according to claim 2, wherein, in order to carry out the rotary movement of the bolt, the aircraft door lock comprises:
- a rotation element, which is connected to the bolt for conjoint rotation; and
- an actuating rod, which is coupled to the rotation element in a manner spaced apart from the rotation element,
- wherein the actuating rod is configured to carry out a reciprocating movement about an axis of rotation of the rotation element such that the bolt is moved selectively between an open position, in which the bolt is not received in the closure block, and a locked position, in which the bolt is received in the closure block.

4. The aircraft door lock according to claim 2, wherein, in order to carry out the rotary movement of the bolt, the aircraft door lock comprises:
- a joint, to which the bolt is fastened in a rotatable manner; and
- an actuating rod, which is hinged to the bolt in a manner spaced apart from the joint,
- wherein the actuating rod is configured to carry out a reciprocating movement about a joint axis of the joint such that the bolt can be moved selectively between an open position, in which the bolt is not received in the closure block, and a locked position, in which the bolt received in the closure block.

5. The aircraft door lock according to claim 1, also comprising:
- a sliding device, which is arranged on the portion of the bolt that is received in the closure block.

6. An aircraft door comprising:
- a door leaf structure, which is configured to close an opening in an aircraft;
- a hinge arm, which is coupled to the door leaf structure and is configured to guide the door leaf structure between an open position and a closed position, in which the opening in the aircraft is closed by the door leaf structure; and
- an aircraft door lock according to claim 1.

7. The aircraft door according to claim 6, also comprising:
- a lifting mechanism, which is configured to move the door leaf structure in the closed position in a direction that differs from a direction of movement of the door leaf structure between the open position and the closed position.

8. The aircraft door according to claim 7, also comprising:
- at least one two-part door hinge, wherein a part of the door hinge is arranged on the door leaf structure and a further part of the door hinge is arranged on an aircraft structure surrounding the opening in the aircraft,
- wherein the lifting mechanism is also configured to move the door leaf structure such that the two parts of the door hinge are moved into an overlapping position and a free position.

9. The aircraft door according to claim 7, also comprising:
- a joint arrangement, which is arranged between the hinge arm and the door leaf structure and is configured to allow a first rotary movement of the door leaf structure relative to the hinge arm while the door leaf structure is guided between the open position and the closed position, and to allow a second movement, caused by the lifting mechanism, of the door leaf structure relative to the hinge arm, wherein the second movement exhibits a direction that is substantially parallel to an axis of rotation of the first rotary movement.

10. An aircraft having at least one aircraft door according to claim 6.

* * * * *